(12) United States Patent
Ozanne et al.

(10) Patent No.: US 8,549,992 B2
(45) Date of Patent: Oct. 8, 2013

(54) APPARATUS WITH PRESSURISED GAS SUPPLY FOR PREPARING BEVERAGES

(75) Inventors: Matthieu Ozanne, Chessel (CH); Jean-Paul Denisart, la Conversion (CH)

(73) Assignee: Nestec S.A., Vevey (CH)

( * ) Notice: Subject to any disclaimer, the term of this patent is extended or adjusted under 35 U.S.C. 154(b) by 986 days.

(21) Appl. No.: 11/571,394

(22) PCT Filed: Jun. 23, 2005

(86) PCT No.: PCT/EP2005/006802
§ 371 (c)(1),
(2), (4) Date: Dec. 28, 2006

(87) PCT Pub. No.: WO2006/005425
PCT Pub. Date: Jan. 19, 2006

(65) Prior Publication Data
US 2007/0175927 A1    Aug. 2, 2007

(30) Foreign Application Priority Data

Jul. 9, 2004 (EP) .................................. 04016163

(51) Int. Cl.
*A47J 31/32* (2006.01)
(52) U.S. Cl.
USPC ........... 99/302 FB; 99/302 R; 99/300; 99/307
(58) Field of Classification Search
USPC .............. 99/302 R, 295, 289 R, 307, 302 FB, 99/300
See application file for complete search history.

(56) References Cited

U.S. PATENT DOCUMENTS

| 3,194,170 | A | * | 7/1965 | Ulbing | 417/394 |
| 3,478,670 | A | * | 11/1969 | Fuqua | 99/283 |
| 3,526,223 | A | | 9/1970 | Curtis | |
| 4,143,589 | A | * | 3/1979 | Weber | 99/282 |

(Continued)

FOREIGN PATENT DOCUMENTS

| EP | 0512468 | 11/1992 |
| EP | 0512470 | 11/1992 |

(Continued)

OTHER PUBLICATIONS

International Search Report for PCT/EP2005/006802 mailed Nov. 10, 2005, 3 pages.

(Continued)

*Primary Examiner* — Reginald L Alexander
(74) *Attorney, Agent, or Firm* — K&L Gates LLP

(57) ABSTRACT

Apparatus for preparing beverages comprising a module (10) for distributing a beverage by supplying a pressurized liquid, a liquid supply tank (7), gas supply means (65) configured to supply the module with pressurized liquid, a liquid feed chamber (80), the said chamber being arranged, in a filling configuration, to communicate with the tank (7) in order to be filled with liquid and the said chamber being arranged, in a module supply configuration, to communicate with the gas supply means in order to pressurize the liquid in the chamber and to distribute a quantity of liquid under a certain pressure through the module. Preferably, the chamber (80) is bounded by at least one elastic wall (85), separating the gas from the liquid in a sealed manner and, configured to deform elastically and thereby reduce the internal volume of the chamber under the effect of the gas thrust against this wall. The invention applies, for example, to mobile or portable coffee or multi-beverage machines.

27 Claims, 5 Drawing Sheets

(56) References Cited

U.S. PATENT DOCUMENTS

| | | | |
|---|---|---|---|
| 4,890,653 A * | 1/1990 | Sartulairi | 141/82 |
| 4,974,674 A | 12/1990 | Wells | |
| 6,021,925 A | 2/2000 | Gashgaee et al. | |
| 6,142,063 A * | 11/2000 | Beaulieu et al. | 99/283 |
| 6,666,130 B2 * | 12/2003 | Taylor et al. | 99/305 |
| 7,377,207 B2 | 5/2008 | Hug et al. | |

FOREIGN PATENT DOCUMENTS

| | | |
|---|---|---|
| FR | 94925 | 1/1970 |
| JP | 05-130944 | 5/1993 |
| JP | 11-337385 | 12/1999 |
| JP | 2005-534437 | 11/2005 |
| TW | 428071 | 4/2001 |
| WO | WO9401344 | 1/1994 |
| WO | WO9902081 | 1/1999 |
| WO | WO2004014205 | 2/2004 |

OTHER PUBLICATIONS

Written Opinion of the International Searching Authority mailed Nov. 10, 2005, 6 pages.

* cited by examiner

APPARATUS WITH PRESSURISED GAS SUPPLY FOR PREPARING BEVERAGES

The present invention relates to an apparatus for preparing beverages or other preparations from a food substance. The invention relates more particularly to distribution machines, such as coffee or multi-beverage machines, particularly mobile or portable apparatus.

BACKGROUND

Apparatus of the coffee machine type for preparing beverages, which use packed or unpacked portions of foods substance(s) are very widespread among individuals and even among communities, commercial premises and businesses. The preparation principle is based on the extraction of the substance by the passage through this substance of a quantity of cold or hot liquid under high pressure, typically a pressure several times higher than the atmospheric pressure. The packed portions may be partially rigid capsules or flexible, hermetically sealed or partially open bags, or even filter doses.

An example of a capsule is described in patent EP 0 512 468 B1. An example of a bag is described in patent EP 0 602 203 B1.

Such extraction systems present many advantages. On the one hand, the individual packages are easy to use and do not require batching the quantity of coffee to be placed in the machine. The user places a capsule, a dose of ground coffee or other portions in the machine, then presses a button to start extraction. On the other hand, the individual packages are batched to deliver a beverage, such as coffee, having the desired characteristics such as sufficient character, flavour, foam or other important attributes. If they are impermeable, they also usually preserve the freshness of the substance better up to the time of extraction. Finally, the preparation conditions, such as the temperature, pressure, extraction time, are easier to control; this guarantees relatively controlled and constant quality to the consumer.

An example of an extraction method is described in patent EP 0 512 470 B1.

In order to extract a beverage under pressure from these portions, of the capsule or other type, it is necessary to use a relatively powerful water pump such as a piston pump. These pumps use the mains electric power. They are also rather noisy during extraction due to vibrations.

It is also difficult to move these preparation apparatus, as on a trolley or simply by carrying them, because of their electrical connection. In fact, it would be an advantage to make these apparatus more mobile in order to propose beverages in locomotion facilities like the train, airplane, or in certain premises such as cinemas, theatres, or in public places such as beaches, parks, poolsides and other public or private places, along country walks, campsites or in other situations.

French certificate of addition FR 94.925 relates to a portable coffee percolation apparatus that comprises a receptacle provided with a deformable membrane which is deformed by a pressurised gas from a cylinder, to send the pressurised water into a nozzle comprising a spout receiving the coffee to be percolated. However, the device and its membrane are only configured to eject the fluid under the gas pressure into the nozzle, but they are not configured to fill the chamber with liquid. In order words, the membrane only performs the role of a filling "piston". The membrane does not have elastic return properties suitable for creating a suction of the liquid into the chamber from an external liquid source. The filling is carried out manually through a plug. Such an arrangement raises serious safety questions for an apparatus for preparing hot beverages, because the chamber is maintained under gas overpressure, and even under slight overpressure, hot or boiling water could be uncontrollably expelled outside the chamber when the chamber plug is opened. Furthermore, such an apparatus is impractical because of the obligation of manual filling. Thus, to provide satisfactory self-contained operation, the chamber must be sufficiently large (several liters); this demands the use of excessive volumes of gas.

Patent application WO 99/02081 proposes a coffee machine, more precisely a mobile machine, in which the pressure required to extract the ground coffee is generated by compressed air. The water for preparing the coffee is kept in a thermally insulated container. The water may be heated by electric heating elements. This solution presents the advantage of producing the extraction pressure by a self-contained means, such as a gas cylinder, placed below the machine. The machine can be installed on a trolley with the gas cylinder installed in a trolley compartment provided for the purpose.

However, such a device presents a number of drawbacks. In fact, in this invention, the gas in the cylinder communicates with the hot water tank directly. This means that the entire volume of the tank is kept under constant pressure, of about several bar.

It is therefore necessary to provide a large capacity tank to withstand the pressure; this raises problems of design and manufacture, in order to guarantee sufficient safety. If the tank is accidentally fractured, it may explode and cause damage. In case of leaks, hot water jets may escape and cause accidents such as burns. Moreover, the design of the tank is limited in the choice of materials, and it cannot use brittle materials with low mass heat capacity such as glass, for example. Finally, prolonged contact of the gas with a large reserve of water under high pressure can also cause the uncontrolled dissolution of gas in the water; this can therefore deteriorate the taste of the beverage, for example, by making it slightly sparkling or sour.

Patent application WO 2004/014205 relates to a device for preparing a beverage using hydraulic means of the piston type to push the liquid into the extraction chamber in which the capsule is installed in order to extract the beverage under pressure. The piston is actuated by a pressurised gas. However, it is necessary to guarantee sealed operation of the system over a large number of cycles, which is liable to raise problems.

Co-pending European application 03026792.6 relates to a device for preparing a beverage in which the water is introduced into a feed chamber and expelled under pressure by a gas, which is itself introduced into the chamber. The chamber is filled by hydrostatic effect from a tank. The chamber can advantageously be installed in the tank itself to avoid heat losses. However, the filling of the chamber is relatively slow; this raises problems in the preparation of several beverages in succession, particularly for large volumes of beverages delivered.

It is therefore an object of the present invention to propose an apparatus for preparing beverages that is quieter than the apparatus using pumping systems actuated by electrical energy.

It is a further object of the invention to propose an apparatus that is suitable for mobile or portable use, while avoiding the drawbacks of the solution of patent application WO 99/02081.

In particular, one of the objects is to propose an apparatus with sufficient self-contained liquid capacity but in which only a limited volume of liquid is pressurised, in order to reduce the risks and drawbacks associated with the maintenance of a large capacity tank under permanent pressure. A further object is to propose a simple, sealed structure that is reliable during prolonged use. A further object is to reduce the filling time in order to increase the capacity to serve several beverages in succession in a minimum of time. A further object is to reduce the heat or cold losses of the apparatus, in particular to improve its mobility.

SUMMARY

For this purpose, the invention relates to an apparatus for preparing beverages comprising:
- a module for distributing a beverage by supplying a pressurised liquid,
- gas supply means configured to supply the module with pressurised liquid,
- a liquid feed chamber, suitable for communicating with the gas supply means in order to pressurise the liquid in the chamber and to distribute a quantity of liquid under pressure through the module. The chamber is bounded by at least one elastic wall, separating the gas from the liquid in a sealed manner and, the said wall being configured to deform elastically and thereby reduce the volume of liquid in the chamber under the effect of the gas thrust against this wall; the reduction in volume of liquid in the chamber driving liquid outside the chamber and towards the beverage distribution module.

According to one aspect of the invention, the device comprises a feed tank for filling the chamber with liquid; the said chamber having a smaller capacity than the tank; and being arranged, in a filling configuration, to communicate with the said tank in order to be filled with liquid by the suction effect created when the gas stops compressing the wall and when the wall returns to the initial position under its own elasticity.

The gas supply means are preferably self-contained gas supply means. These means may be moveable with the apparatus. However, the gas supply means may also be means for supplying a gas from an immobile source such as a home or industrial source. The gas may be any gas. Preferably, the gas is compressed air, $CO_2$, $N_2$, $N_2O$ or argon or a mixture thereof. The gas reserve is preferably a cylinder or a reinforced tank with a capacity of between 0.1 and 20 liters, preferably between 0.5 and 5 liters. The capacity is obviously selected according to the usage needs of the apparatus; if, for example, the apparatus is intended to be carried or rolled, or infrequently moved.

The liquid used to supply the module is generally hot or cold water. However, it may be another type of diluent such as milk or another food diluent.

The beverage distribution module according to the invention may be a device placed under liquid pressure for extracting or dissolving a food substance. It may involve a device for receiving a portioned package containing a food substance such as ground or soluble coffee, tea, cocoa, herbal tea, powered milk, soluble culinary products or a combination of these ingredients.

According to a further aspect of the invention, the liquid feed chamber comprises a liquid inlet associated with a one-way valve configured to retain the liquid in the chamber after the chamber is filled. The chamber is thus sealed with respect to the liquid tank by a valve; this ensures control of the liquid volume present in the chamber and serves to control the quantity of liquid delivered to the module. In a complementary manner, the liquid feed chamber comprises a liquid outlet associated with a one-way valve acting to prevent the return of liquid in the chamber. This valve acts to ensure that the liquid expelled from the chamber does not return to the chamber when the gas thrust is stopped. This ensures better control of the quantity of liquid supplied to the supply module and the formation of air pockets is reduced.

According to a further aspect of the invention, the chamber is filled with liquid by the suction effect created when the gas stops compressing the wall and when the chamber returns to the initial position under its own elasticity. Thus, the chamber filling time is considerably reduced. The chamber thus returns faster to a filling configuration before the distribution of a new beverage. A further advantage derives from the fact that the liquid is sucked into the chamber; this contributes to the improved emptying of the tank.

Preferably, the wall has a sufficient own elasticity to be able to suck the liquid from the tank into the chamber up to a liquid level in the chamber that exceeds the liquid level in the tank. Thus, the tank can be emptied more easily. The liquid capacity that can be pumped into the apparatus is thereby increased. The elasticity may be such that the tank can be completely emptied. For this purpose, the chamber also has a liquid inlet extending into the bottom of the tank in order to suck all the liquid present in the tank.

Thus the elastically deformable wall is preferably made of an elastomer or silicone material. This procures the advantage of supplying a material that guarantees better tightness and a capacity to deform elastically while supplying a high and reproducible elastic return force. The silicone material is preferred for its capacity to preserve its mechanical properties better, including in a humid environment, and in a wide range of liquid delivery temperatures; in particular, between 5 and 95° C. The silicone wall preferably has a thickness of between 1 and 15 mm, preferably between 2 and 10 mm, and a hardness of at least 55 shore A, preferably above 60 shore A.

According to another aspect, the elastic wall is tube-shaped and surrounds the chamber in a sealed manner. This shape favours a uniform reduction in volume of the chamber. The tubular elastic wall is thus made integral with a "spool" shaped central core. Such a core has a central cylindrical portion associated with end portions that are progressively flared. The central core is also hollow in one end to the other, in order to allow the liquid present in the reservoir to pass through by natural convection and thereby favour the heat or cold transfers. The tubular elastic wall is mounted in a sealed manner on the edges of the flared portions of the central core. This configuration presents the advantage of avoiding excessive local stresses during the crushing of the elastic wall against the core, while retaining a simple shape that is easy to make and to assemble. The core may be mounted in two separate parts, of which one comprises the central portion and one of the flared end portions, while the other part forms the second flared end portion.

According to a construction aspect, the elastic wall is surrounded by a rigid tube comprising at least one gas inlet. The rigid tube is joined to the edges of the end portions of the core. The gas is thus blown under pressure between the rigid tube and the elastic wall; in a sealed manner, on the one hand, with respect to the exterior and, on the other, with respect to the chamber bounded by the internal surface of the elastic wall and the central core.

Preferably, the elastic wall is in adjacent contact with the internal surface of the tube. Thus, unnecessary losses of gas are minimal because the volume at rest offered between the elastic wall and the tube is very small, preferably zero. The rigid tube also preferably comprises a plurality of peripherally spaced gas inlets on its perimeter. This configuration serves to make the deformation of the elastic wall symmetrical, both under the effect of the gas thrust and during the return of the wall to its initial shape. The tubular wall recovers its initial shape as soon as the gas pressure is released, without excessive waiting time. The gas is thus expelled at several places around the rigid tube; this enables the tubular wall to recover its initial shape faster without deformation liable to hinder the removal of the gas.

According to one aspect of the invention, valve means are provided, which are moveable in at least two positions to act:
a) in a chamber liquid filling and/or rest position; by cutting off the gas supply that exerts its thrust against the wall;
b) in a supply position to send the pressurised liquid into the beverage distribution module; by placing the gas supply in thrust configuration against the elastic wall.

Thus, the valve means serve to act in two positions; a chamber filling and rest position, and a liquid module feed position. During the filling of the chamber, the valve means are switched to stop the intake of gas and to place this intake to the atmosphere, so that the elastic wall is released from any thrust stress and can return to its initial position.

In one mode, the supply position, the entire volume of the chamber is expelled under pressure and the chamber is emptied completely of its liquid volume with each return to the supply position by the valve means. In this way, the apparatus always delivers a constant volume of liquid to the module and the liquid volume is replenished at each cycle. This procures an important advantage, because the chamber performs the function of precise batching of the quantity of liquid. The elastic wall must therefore be selected so that it can develop sufficiently high elastic return forces for the entire volume of the chamber to be filled again with liquid at each end of cycle, repetitively and without fatigue.

In a preferable configuration, the chamber is placed inside the liquid tank. In this case, the device is simplified, because the chamber can communicate with the tank via a simple opening. Such a configuration also contributes to decrease the overall size of the apparatus. Finally, if the tank contains a hot or refrigerated liquid, the heat or cold losses are reduced in the tank and/or the chamber because of the heat transfers made possible between the two chambers.

In a portable or mobile use of the apparatus, the tank preferably comprises thermally insulated walls which serve to maintain the liquid in a range of higher or lower temperatures than the ambient temperature. The tank may also comprise a removable lid or plug to allow for easy filling. Thus, it is possible to maintain a liquid for a certain interval at a temperature necessary for the extraction conditions of the beverage. This makes it possible to keep the liquid at a temperature of between 50 and 95° C. for several minutes. The liquid can be poured hot or boiling into the tank and/or be heated and/or simply kept for a longer period at temperature in the tank by heating means. The insulating walls preferably comprise at least one internal wall made of a low mass heat capacity material and at least one insulation layer surrounding the internal wall. This may, for example, involve walls of the "thermos" type typically comprising at least one glass or metal internal wall and, also preferably, at least one insulation layer external to the internal wall. Preferably, the insulation layer is a polyurethane foam that presents the advantage of being easily mouldable to the desired shape; if necessary, with the rest of the frame. The polyurethane insulation layer may also enclose an internal stainless steel tank.

The walls may also be formed from a double wall of glass or metal separated by another insulation layer formed from a gas or a partial or total vacuum, with or without foam.

The apparatus comprises a bearing structure that has the function of supporting the various functional components of the apparatus, including the lines that communicate with the feed chamber. The main lines are the gas supply line, the line for venting the chamber to atmospheric pressure, and the feed line from the chamber to the extraction module. An air intake line into the tank is also useful if the tank is indeformable.

For example, the bearing structure may also accommodate the extraction module. It is also made to receive the device for connection to the gas reserve. It may house the valve means and its manual (such as a lever) or electrical (push-buttons) control activation means. It may also comprise various electrical connections and/or monitoring and control components.

The bearing structure may integrate or be combined with transport means such as a handle, straps, a harness and/or casters, a rolling tray or stretcher, etc., to facilitate the carrying and/or rolling of the apparatus.

Preferably, the gas pressure means must be suitable for delivering a gas supply pressure of between 2 and 25 bar, preferably between 5 and 20 bar. This pressure is necessary to empty the chamber partially or completely, to transport the liquid through the feed line to the extraction module, and to extract the beverage though the food substance at a sufficient extraction pressure taking account of the pressure drop in the circuit.

The supply pressure is preferably controlled by a pressure control unit such as a pressure reducer tared to the supply pressure. The gas flow rate may also be controlled independently by an obstruction in order to permit a progressive pressure build-up in the extraction module. In certain circumstances, such an obstruction is necessary to prevent an excessively sudden rise in pressure upon the opening of the valve means. An excessively sudden rise in pressure may have the consequence of prematurely opening, tearing or bursting the packaging of the portion of substance.

The invention further relates to a pumping device for supplying pressurised liquid to a beverage distribution apparatus comprising:
a body comprising a gas supply inlet,
a chamber for receiving the liquid,
a liquid inlet communicating with the chamber,
a liquid outlet communicating with the chamber from which the liquid is expelled under a certain pressure,
the said chamber being bounded by at least one elastic wall separating the liquid from the gas supply in a sealed manner;
the wall being configured to deform elastically and thereby reduce the internal volume of the chamber under the effect of the gas thrust against the said wall; under the effect of the gas thrust against the said wall, the reduction in volume of the chamber driving the liquid through the liquid outlet,
characterised in that
the device is configured to be filled by the suction created by the wall which has its own sufficient elasticity enabling it to return to position when the gas stops deforming the wall and, by this elastic return effect, to create a vacuum in the said chamber in order to suck the liquid into the chamber through the liquid inlet and thereby to fill the chamber with liquid; the said device comprising closure means for retaining a constant volume of sucked liquid in the chamber up to its forced expulsion by the wall under the effect of the gas pressure.

According to one aspect of the invention, the liquid inlet comprises a one-way valve permitting the liquid to enter during its suction by the return to position of the wall, and the retention of the said liquid in the chamber during the thrust of the wall by the gas.

In a preferred configuration, the tubular wall is made from silicone. The wall also preferably has a hardness of at least 55 shore A, which enables it to return to the initial position while creating a sufficient suction effect to permit rapid filling of the chamber. In another aspect, the body is tubular and positioned adjacently with the tubular wall in order to substantially release no dead volume for the gas when the wall is in the initial undeformed position. This presents the advantage of stressing the elastic wall almost instantaneously by using only a minimum quantity of gas. This also serves to provide a more compact device and to optimise the liquid volume of the chamber. According to another aspect of the device, the gas supply communicates with a plurality of gas inlets distributed on the periphery and across the tubular body. It has been found that the distribution of several gas inlets provided a solution to the problem of deformation of the tubular wall during the decompression and thereby permitted faster and unobstructed filling of the chamber with liquid.

"Portion" of food substance means a packed or unpacked portion. A packed portion may be a dose of food substance contained in a packing of the cartridge, bag type or other appropriate packaging modes. An unpacked portion may be a dose of food substance, such as ground coffee, directly introduced into the chamber of the extraction module.

"Liquid" means water or another food liquid, depending on the applications.

These objects, features and advantages, and others of the present invention, are detailed with regard to the detailed description of the preferred embodiments and with regard to the drawings appended hereto.

DETAILED DESCRIPTION

Figure 1:
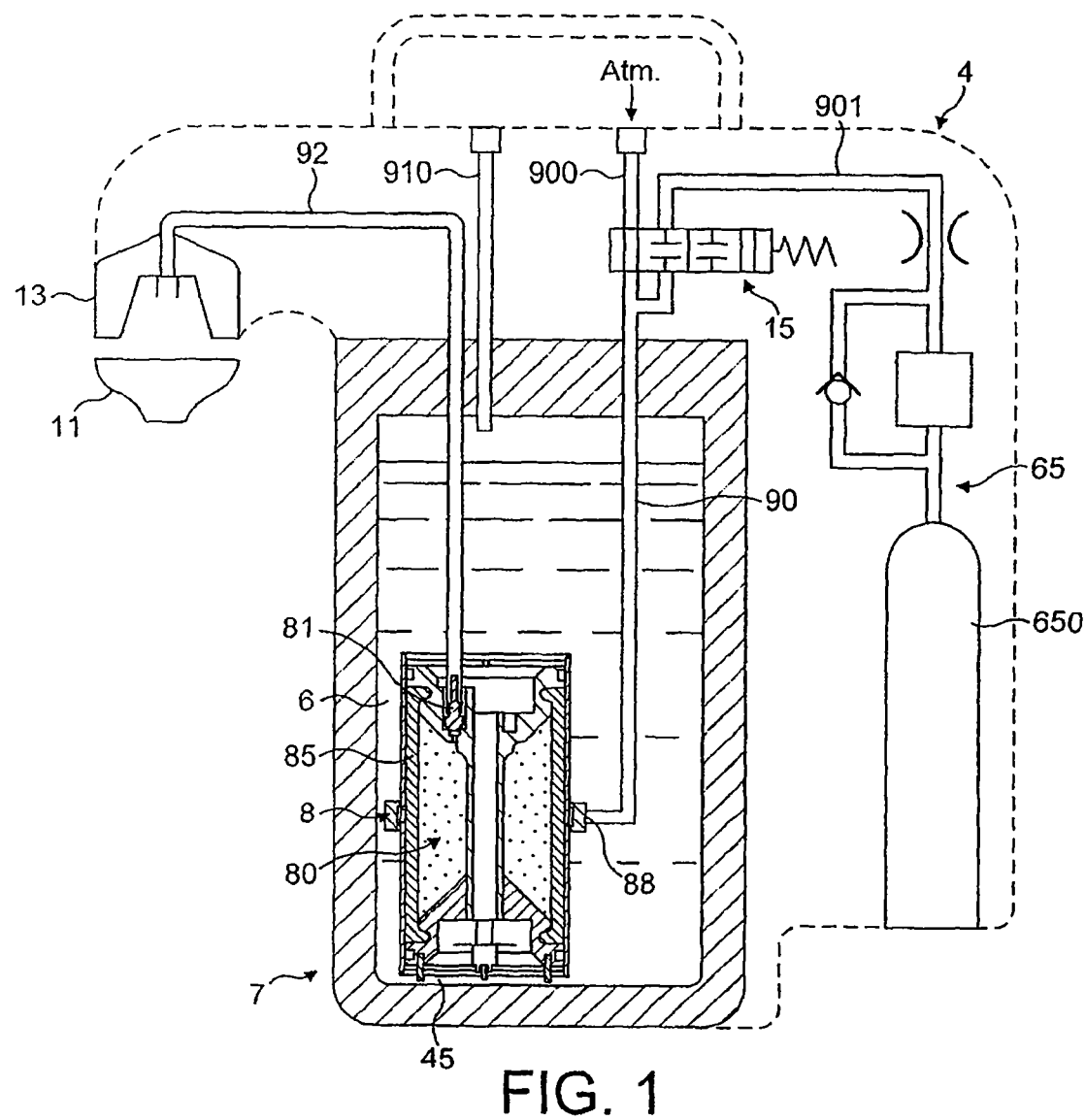
FIG. 1 shows a schematic cross section of an apparatus according to the invention in a chamber filling or rest configuration.
Figure 2:
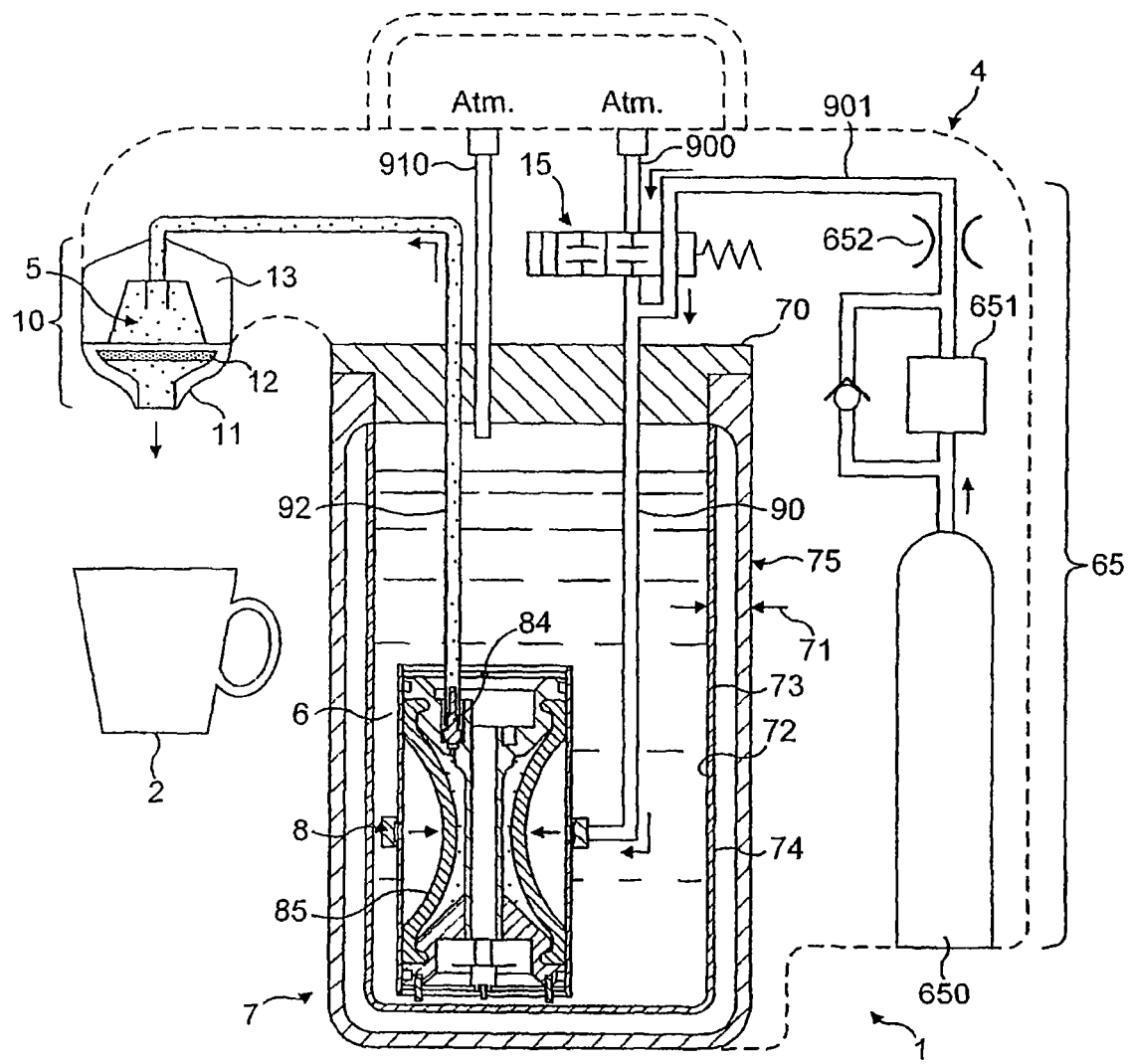
FIG. 2 shows a schematic cross section of an apparatus according to the invention during the supply of pressurised liquid to the liquid feed module and hence during the delivery of the beverage.

With reference to FIGS. 1 and 2, the device according to the invention is an apparatus 1 capable of delivering hot or cold beverages by the pressurised extraction of a substance present in a packed portion 5 of the capsule or bag type. A pressurised liquid, typically water, is sent through the substance and the beverage extracted thereby is collected in a receptacle such as a cup 2. The device of the invention hence comprises a feed module 10, for example, for the pressurised extraction of the substance present in the packed portion, arranged so as to receive one or more particular types of portions 5. The module generally comprises a capsule support 11, possibly means 12 for opening the capsule acting under the effect of the pressure therein to release the extract at a given extraction pressure, means 13 for spraying or injecting liquid into the capsule such as a capsule cage comprising needles or blades to open the capsule associated with one or more orifices for injection of the liquid. A capsule may, for example, be a capsule of the Nespresso® brand marketed by Nestlé Nespresso S.A. and which operates with an extraction module suitable for receiving such a capsule and comprising means for opening the membrane of the capsule.

The module commonly comprises closure means for keeping the capsule firmly sealed to ensure a pressure rise in the capsule. These closure means may comprise hinged means 11, 13 in the form of jaws which can be opened/closed by actuating elements by means of a lever (not shown).

The module may be part of a bearing structure or body 4 which encompasses the functional components of the apparatus, thereby forming with the rest of the apparatus a compact unit that is easily mobile and/or portable.

In a preferred construction, the liquid tank 7 may be part of the bearing structure 4. The tank 7 has a capacity adapted to the needs of the apparatus and to its use; the principle being that the apparatus can deliver a sufficient number of beverages during service. The tank 7 is therefore designed to supply the extraction module 10 in a self-contained manner, that is, without a continuous intake of water from a source foreign to the apparatus. The tank comprises a body delimiting an enclosure 6 that is closed by a lid or plug 70 that adapts by any removable connecting means to the body of the tank, such as by clipping, screwing or other.

Preferably, the tank enclosure is insulated from the external environment by insulating walls 71. These walls may form an insulating assembly approaching adiabatic conditions known by the usual term of "thermos". This name may cover a large number of possible insulation configurations. The most common being the combination of at least one layer 72 of a low mass heat capacity material such as glass or metal (copper, aluminium, stainless steel, etc.) and, preferably, at least one thermally insulating layer 73 which surrounds the low mass heat capacity layer. An insulating layer may be a gas such as air or argon, vacuum or a material based on foam, plastic or fibres. An efficient thermal insulation assembly will preferably have at least two layers of glass or metal 72, 74 separated by an insulating layer 73, preferably of vacuum, foam, and/or gas.

The tank 7 of the apparatus further comprises an impact resistant envelope 75 such as a plastic casting surrounding the insulation assembly of the tank. The part 75 may constitute a one-piece part of the tank body or a part added on to others to form the external protection of the tank 7. The part 75 may advantageously and simultaneously constitute the insulating and protection layer if it is provided in an appropriate material such as polyurethane foam.

Figure 8:
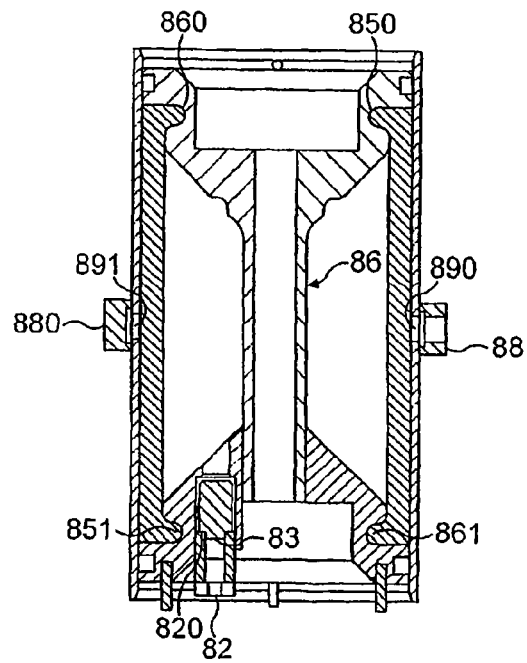
FIG. 8 shows the device in a cross section on B-B.

According to one aspect of the invention, a liquid pumping device 8 is provided, inserted in communication with the liquid between the tank 7 and the module 10. The pumping device 8 is connected to the module 10 by a feed line 92. This line communicates into a feed chamber 80 via a liquid outlet 81. A one-way valve 84 is provided in the outlet 81 to prevent liquid backflow from the line 92 into the chamber 80. The pumping device 8 is, in the example in FIG. 1, located inside the tank 7, but it could be arranged differently, and it could also be located outside the tank. The pumping device 8 is located in the lower half of the tank, preferably in the bottom of the tank, and comprises a liquid inlet 82 from the chamber 80 able to communicate with the tank. The inlet 82 is oriented towards the bottom of the chamber, preferably at the lowest part of the chamber 8, and may be prolonged by a tube portion to the bottom of the tank. This inlet 82 is selectively closed by a one-way valve 83 (FIG. 8) comprising a needle or ball and a seat 820 for the needle or the ball. The needle or ball is positioned inside the chamber so as to actuate closure from the interior by the effect of an internal pressure in the chamber 80 during the gas thrust and so as to actuate opening by the effect of an internal vacuum in the chamber as described below. The leaktightness between the ball or the needle can be improved by an annular seal, or other equivalent element, which cooperates with the element around the opening in order to ensure leaktight closure.

The volume of the chamber 80 may vary as required. The volume can serve for the extraction of at least one portion of substance (one capsule or bag or an unpacked dose). It may reach the equivalent to several portions such as two, three, indeed four successive portions. For example, the chamber may have a volume of between 40 mL and 1000 mL. Preferably, the chamber will have a volume of between 110 mL and 250 mL; this corresponds to the capacity of a large cup of coffee, tea or hot chocolate or other.

The pumping device 8 is described in greater detail with regard to FIGS. 4 to 8. According to one aspect of the invention, the chamber 80 of the liquid pumping device is delimited by at least one elastically deformable wall 85. The wall 85 is tightly mounted on a central core 86 so as to define a chamber 80 with a substantially annular cross section. The wall 85 has the shape of a tube which comprises inwardly turned elastic protuberances 850, 851 at its ends, which take position in the grooves 860, 861 located at the ends of the central core. An external rigid tubular body 87 is positioned against the wall 85 and engaged at its ends on the central core 86 to form, between the internal surface of the body 87 and the external surface of the elastic wall 85, a zone of "dead" volume or at least of minimum volume into which the gas is blown under pressure. The rigid tube presses against the elastic wall while sufficiently compressing the ends of the elastic tubular wall against the core in order to guarantee the tightness of the gas as well as the liquid chamber.

The tubular body 87 comprises at least one gas supply 88. Preferably, on the perimeter of the tubular body 87, a plurality of gas inlets 890, 891, 892, 893 are provided through the tube body 87. These inlets cross the tube and are preferably distributed at several places spaced on the periphery of the tube. For example, four inlets are provided which are distributed with an inlet spacing of about 90 degrees. The gas is guided into each inlet by a peripheral line 880 with a reverse U-section, which extends on the circumference of the tubular body. Such a configuration serves to compress the tubular wall uniformly by the gas and to release the wall without any risk of asymmetrical deformations of the elastic wall, and if not, to stop, or at least slow down, the escape of the gas from the device. In fact, it has been found that the elastic tubular wall is crushed under the gas pressure against the core and clings to several ribs which divide the compressed volume into several quarters. If a single gas outlet is provided, the gas only escapes from the quarter in which the removal hole is located, whereas the ribs tend to deform asymmetrically without permitting the gas to escape from all the other quarters. This is followed by at least a wait of several seconds before the gas can finally escape from the remaining quarters via leaks.

The number of gas inlets is thus preferably at least three, to prevent this asymmetrical deformation.

The elastic wall 85 is advantageously made from an elastomer or silicone material. Its thickness, toughness and hardness are selected as a function of the pressure demanded by the apparatus. In general, the extraction pressures are about between 2 and 25 bar, preferably between 5 and 20 bar. The wall must therefore be able to deform elastically, and repetitively, in this pressure range. The wall must also have a sufficient elastic return capacity to create a vacuum in the chamber and permit the suction of the liquid through the liquid inlet 82. Hence preferably, the wall is formed from a material having a hardness of at least 55 shore A, and preferably above 60 shore A, and a thickness of between 1 and 15 mm, and preferably between 2 and 10 mm. Depending on the materials selected, the thickness of the wall may be between 1 and 8 mm, and preferably between 2 and 5 mm.

The central core of the pumping device has a general "spool" shape, that is, with ends that are progressively flared outwardly. Such a core has a central cylindrical part 862 associated with end portions 863, 864 which are progressively flared. The tubular elastic wall is mounted in a sealed manner on the flared portions. Such a configuration has the advantage of avoiding excessive local stresses during the crushing of the elastic wall, while preserving a shape that is simple to produce and to assemble. The core can thus be mounted in two separate parts, of which one comprises the central part and one of the flared end portions, while the other part forms the second flared end portion.

The central core is also preferably hollow with a chimney 865 that passes through the device longitudinally. The chimney 865 permits the circulation of the liquid present in the tank by natural convection when the device is provided inside the tank. The heat exchanges between the device and the tank are thereby improved. Thus, the liquid present in the pumping device undergoes heat or cold losses much less because it takes advantage of the heat or cold inertia of the liquid present in the tank.

For reasons of easier construction, the central core is composed of at least two parts assembled together; including a part 866 comprising the sections 862, 863 and including the end part 864. The bottom of the device may comprise legs 867 to maintain the device in slight elevation and permit the pumping of the liquid from the bottom of the tank.

Returning to FIGS. 1-3 showing the apparatus, the pumping device 8 communicates selectively, via the gas line means 90, 901 with gas pressure means 65. These means preferably comprise a gas refill 650 in the form of a cylinder, carboy or other, combined with a pressure regulator 651 at the outlet of the refill, such as a pressure reducer. A gas flow regulation means such as a restriction 652 is also preferably provided on the supply between the pressure reducer and the pumping device in order to regulate a progressive pressure buildup of the liquid in the extraction module 10. The line means 90 discharges into the chamber at any appropriate place, such as on the top 82 of the pumping device 8.

The main line 90 is separated by a valve 15 which may be located between the chamber 8 and the gas pressure means 65.

The tank is connected to the exterior via an air intake line 910, making it possible to replace the volume of liquid pumped out of the tank by air.

The valve 15 acts according to a two-way principle. In the first position as shown in FIG. 2, the valve connects the feed chamber 8 to a line 900 open to atmospheric pressure. In the second position, the valve 15 connects the chamber 8 to the gas supply line 901.

Figure 3:
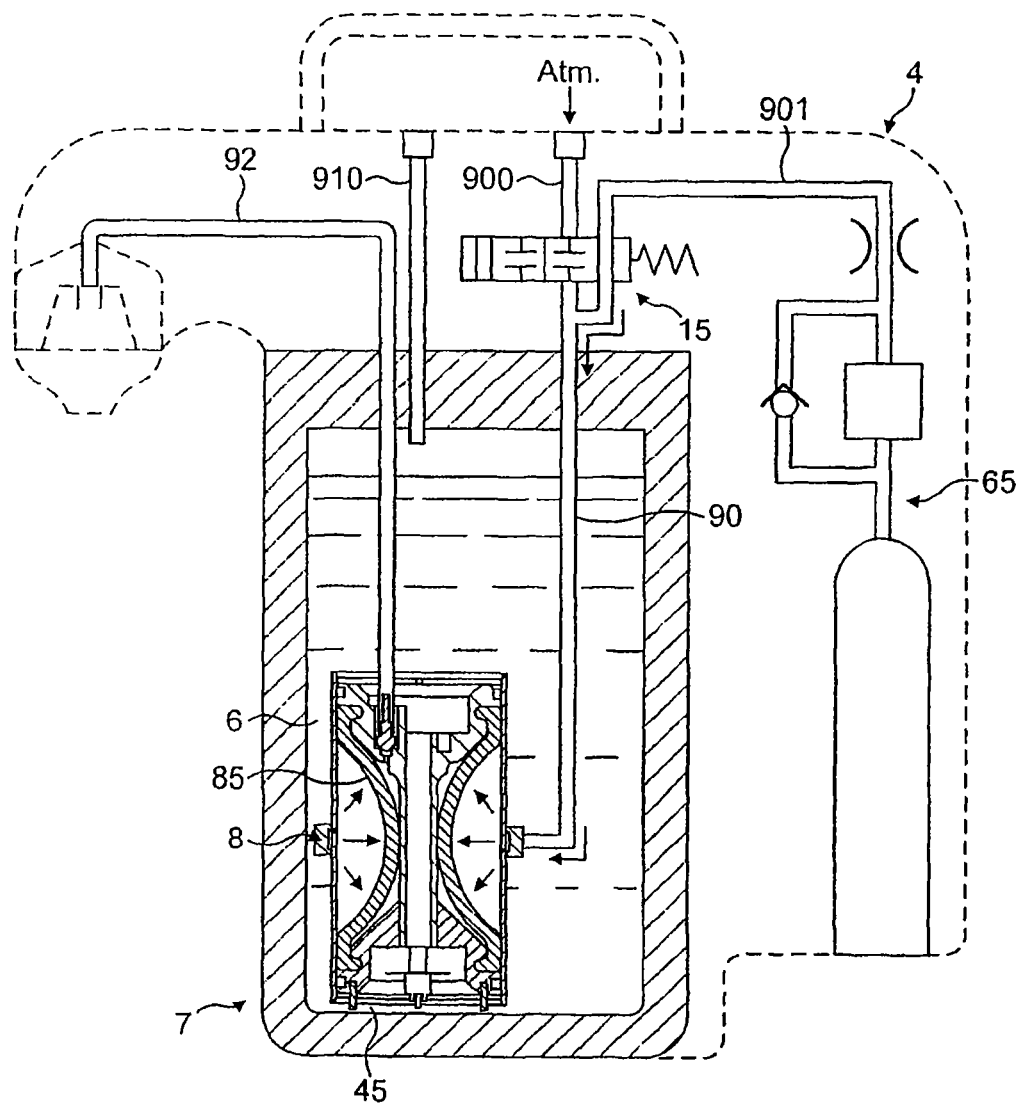
FIG. 3 shows a schematic cross section of an apparatus at the end of the liquid feed.
Figure 4:
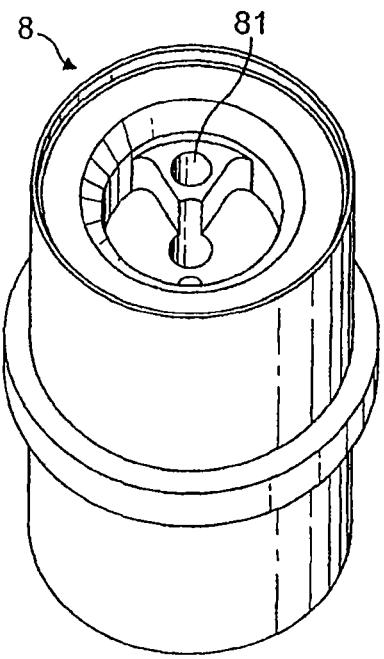
FIG. 4 shows a perspective plan view of the pumping device that includes the liquid feed chamber according to the invention.
Figure 5:
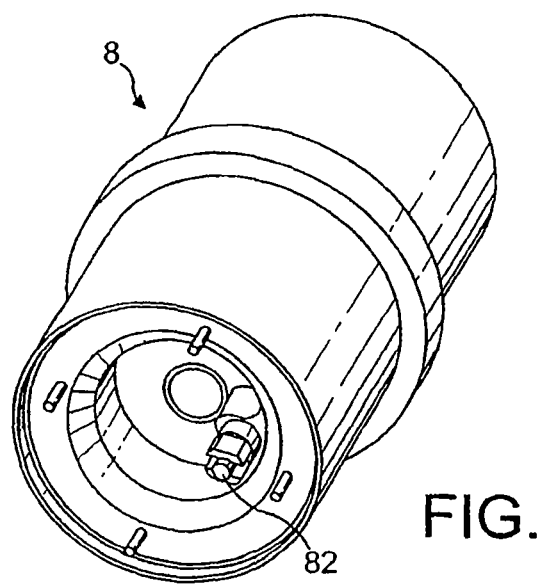
FIG. 5 shows the device of FIG. 4 in a perspective view from below.
Figure 6:
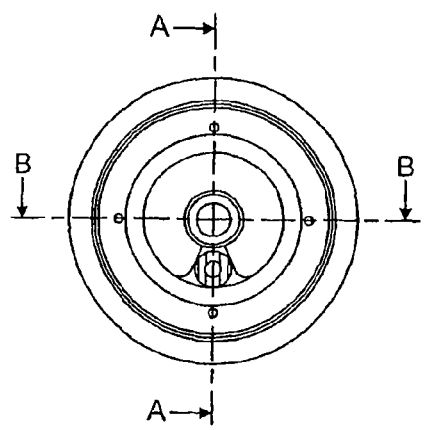
FIG. 6 shows the device in a plan view.
Figure 7:
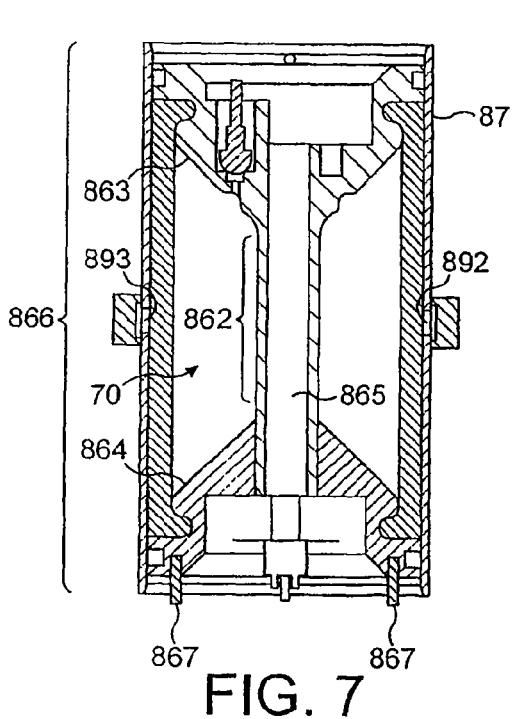
FIG. 7 shows the device in a cross section on A-A.

Such a valve 15 can be actuated manually, as by a lever, a push button or other equivalent element. It may also be actuated by electric pulse (solenoid valve); in this case the valve 15 remains in the chamber equilibrium position or "rest position" in the absence of a pulse (FIG. 1). When an electric pulse is sent to the valve, the solenoid valve shifts into the position to supply the chamber with gas (FIGS. 2 and 3). The return of the solenoid valve to the filling position (FIG. 1) is then actuated either manually or under the action of a timer or by measuring a pressure drop in the circuit below a certain threshold, or by any other appropriate measurement and control means.

Heating means (not shown) may be provided to heat the water before it reaches the extraction module. Such heating means may, for example, be at least a heating resistor immersed in the tank and/or a resistor surrounding the pumping device 8 to heat it. These heating means may also surround the supply line 92 or may be placed inside the line. The resistors may be replaced by any equivalent heating means. These means may be connected to a low voltage electric power supply, for example 12 or 24 volts, or to the mains voltage, for example, 110 or 220 volts.

The volume of the chamber 80 may be between 40 and 1000 cc. Preferably, the volume is determined as a function of the volumes of beverages to be delivered. For example, the volume may be selected equivalent to the volume of the largest beverage produced, as for example, 250 mL. Since the chamber is filled every time that the gas supply is shut off, the chamber is always sufficiently full to supply a new beverage regardless of the volume thereof.

The operating principle of the apparatus according to the invention is as follows:

In the filling position, which corresponds to FIG. 1, the valve 15 is in the open position and the gas supply is open to atmospheric pressure. The elastic wall is hence in the released position, thereby creating a vacuum in the chamber 80 which sucks the water into the chamber. Obviously, the suction effect is added to the hydrostatic pressure due to the water level in the tank. When the water level in the tank falls below the top of the chamber, the filling can continue to take place thanks to the suction effect.

When the feed chamber 8 is full, the apparatus is operational to extract a beverage.

To prepare a beverage such as a coffee, the user hence inserts a portion of coffee 5 into the extraction module 10. The module is closed around the portion.

The user then actuates a control means such as a lever (not shown) to move the valve 15 into the feed position. The main line 90 is then in communication with the gas inlet line 901, thereby pressurising the chamber and closing the one-way valve (FIG. 2).

As the gas enters, controlled by the restriction 652, the elastic wall 85 exerts a thrust on the chamber 80; the pressure rises progressively and the liquid present in the chamber passes the check valve 84 and is discharged into the feed line 92 up to the extraction module. The pressurised water is then forced through the portion of coffee to extract the coffee. The capsule opens under the effect of the extraction pressure, allowing the beverage extract to flow through the portion and into the cup.

The liquid flow stops either when the chamber is completely emptied of the liquid it contains (FIG. 3), or if the valve 15 is returned to the closed position (FIG. 1). This re-closure can be done either manually or automatically.

When the valve resumes the closure position of the gas line, the gas supply is again open to atmospheric pressure. Accordingly, there is no more pressure exerted on the elastic wall, so that it returns to its initial position under its own elasticity. The return to the position of the wall creates a vacuum in the chamber 80 which is again filled with water (FIG. 1). The apparatus is then ready for the extraction of the next beverage.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. Apparatus for preparing beverages comprising:
    a module for distributing a beverage by supplying a pressurized liquid;
    gas supply means for supplying the module with pressurized gas;
    a liquid feed chamber, suitable for communicating with the gas supply means in order to pressurize the liquid in the chamber and to distribute a quantity of liquid under a certain pressure through the module, the chamber being defined by at least one elastic wall and a core of a liquid pumping device, the elastic wall separating the gas from the liquid in a sealed manner and, the wall being configured to deform elastically and thereby reduce the volume of liquid in the chamber under the effect of the gas against an exterior of the wall, the reduction in volume of liquid in the chamber driving liquid outside the chamber and towards the module, and the elastic wall is mounted on the core to define the chamber,
    an external rigid tubular body positioned against the elastic wall with ends of the tubular body engaged to corresponding ends of the core to form, between the internal surface of the tubular body and the external surface of the elastic wall, a zone into which the gas is blown under pressure;
    a feed tank for filling the chamber with liquid, the said chamber having a smaller capacity than the feed tank and being arranged, in a filling configuration, to communicate with the fill tank in order to be filled with liquid by a suction effect created when the gas stops compressing the exterior of the wall and when the wall returns to an initial position under its own elasticity.

2. Apparatus according to claim 1, wherein the liquid feed chamber comprises a liquid inlet associated with a one-way valve configured to retain the liquid in the chamber after the chamber is filled.

3. Apparatus according to claim 1, wherein the wall has a sufficient elasticity to be able to suck the liquid from the tank into the chamber up to a liquid level in the chamber that exceeds a liquid level in the tank.

4. Apparatus according to claim 1, wherein the wall is made from a material selected from the group consisting of an elastomer and silicone.

5. Apparatus according to claim 1, wherein the elastic wall is tube-shaped and surrounds the chamber in a sealed manner.

6. Apparatus according to claim 1, wherein the elastic wall is surrounded by the rigid tubular body, the rigid tubular body comprising at least one gas inlet.

7. Apparatus according to claim 1, wherein the external surface of the elastic wall is in contact with the internal surface of the tubular body.

8. Apparatus according to claim 1, wherein the rigid tubular body comprises a plurality of peripherally spaced gas inlets.

9. Apparatus according to claim 1, wherein the module comprises a housing suitable for receiving a packed portion of food substance and a liquid injection device for injecting the pressurised liquid from the chamber through the packed portion of food substance.

10. Apparatus according to claim 1, comprising valve means which are moveable in at least two positions to act:
    a) in a chamber liquid filling and/or rest position, by cutting off the gas supply that exerts a force against the wall; and
    b) in a supply position to send the pressurized liquid into the module by placing the gas supply in thrust configuration against the elastic wall.

11. Apparatus according to claim 10, wherein in the supply position, an entire volume of the chamber is expelled under pressure and the chamber is completely emptied of its volume of liquid whenever placed in the supply position by the valve means.

12. Apparatus according to claim 1, wherein the chamber is located inside the liquid tank.

13. Apparatus according to claim 12, wherein the tank comprises thermally insulated walls.

14. Apparatus according to claim 1, wherein the gas supply pressure is between 2 and 25 bar.

15. Apparatus according to claim 14, wherein the gas is selected from the group consisting of compressed air, CO2, N2, N2O, argon, and mixtures thereof.

16. Apparatus according to claim 1, wherein the chamber has a volume corresponding to the maximum volume of the beverage to be produced.

17. Apparatus according to claim 1, wherein the chamber has a volume of between 40 and 1000 cc.

18. Liquid pumping device for supplying pressurized liquid to a beverage distribution apparatus comprising:
a rigid tubular body comprising a gas supply inlet,
a chamber for receiving the liquid,
a liquid inlet communicating with the chamber,
a liquid outlet communicating with the chamber from which the liquid is expelled under a certain pressure,
the chamber being defined by a core of the liquid pumping device and at least one elastic wall, the elastic wall separating the liquid from the gas supply in a sealed manner;
the wall being configured to deform elastically and thereby reduce the internal volume of the chamber under the effect of a gas thrust against an exterior of wall, the reduction in volume of the chamber driving the liquid through the liquid outlet, the wall is mounted on a core to define the chamber, and the rigid tubular body is positioned against the wall with ends of the tubular body engaged to corresponding ends of the core to form, between the internal surface of the tubular body and the external surface of the wall, a zone into which the gas is blown under pressure through the gas supply inlet, the rigid tubular body comprising the gas supply inlet, and
the device is so constructed and arranged to be filled by a suction created by the wall which has a sufficient elasticity enabling it to return to position when the gas stops deforming the wall and to create a vacuum in the chamber in order to suck the liquid into the chamber through the liquid inlet and thereby to fill the chamber with liquid, the device comprising closure means for retaining a constant volume of sucked liquid in the chamber up to its forced expulsion by the wall under the effect of the gas pressure.

19. Device according to claim 18, wherein the liquid inlet comprises a one-way valve permitting the liquid to enter during suction by a return to position of the wall, and the retention of the liquid during the thrust of the wall by the gas.

20. Device according to claim 18, wherein the wall comprises a tubular silicon wall having a hardness of at least 55 shore A.

21. Device according to claim 18, wherein the rigid tubular body is positioned in contact with the wall in order to substantially release no dead volume for the gas when the wall is in an initial undeformed position.

22. Device according to claim 18, wherein the gas is communicated between the internal surface of the tubular body and the external surface of the wall by a plurality of gas inlets distributed on a periphery and across the tubular body.

23. Device according to claim 22, comprising at least three gas inlets.

24. Device according to claim 21, wherein the wall is located between the core and the rigid tubular body.

25. Device according to claim 18, wherein the core is a central core having a spool shape with flared ends to which the wall is mounted in a sealed manner.

26. Device according to claim 18, wherein the core is a central core comprising a chimney passing through it longitudinally, the chamber located between the chimney and the rigid tubular body.

27. Apparatus for preparing beverages comprising:
a module;
a supply of gas to pressurize a liquid;
a chamber communicating with the gas supply to pressurize the liquid in the chamber and to distribute a quantity of liquid under a certain pressure through the module, the chamber defined by at least one elastic wall and a core of a liquid pumping device, the elastic wall separating the gas from the liquid in a sealed manner and, the wall deforming elastically and reducing the volume of liquid in the chamber, and the wall is mounted on the core to define the chamber;
an external rigid tubular body is positioned against the wall with ends of the tubular body engaged to corresponding ends of the core to form, between the internal surface of the tubular body and the external surface of the wall, a zone into which the gas is blown under pressure from the supply of gas; and
a feed tank for filling the chamber with liquid, the chamber having a smaller capacity than the tank, and communicating with the tank so as to be filled with liquid by a suction effect created when a gas stops compressing the wall and when the wall returns to an initial position.

* * * * *